Figure 2:
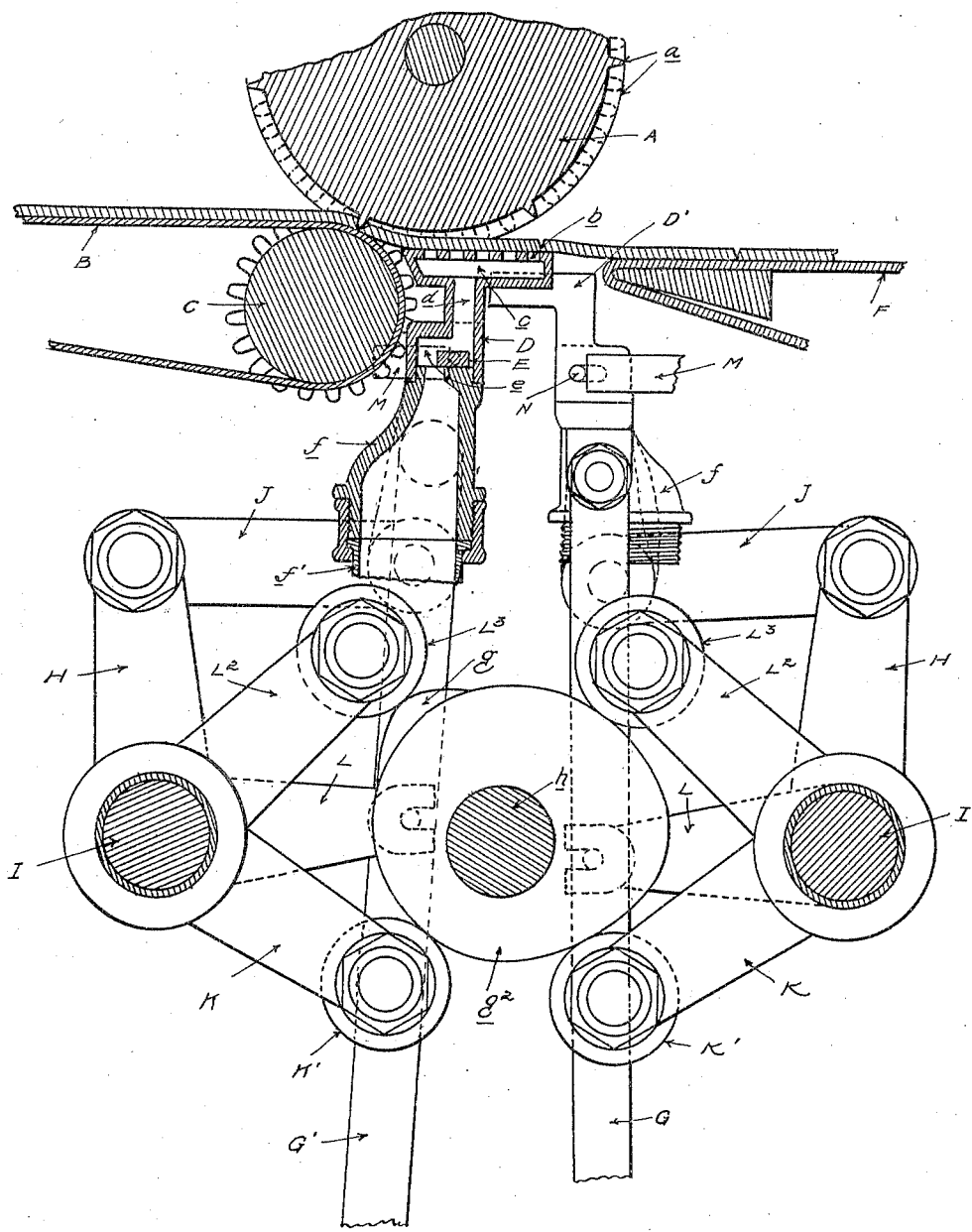

No. 783,930. PATENTED FEB. 28, 1905.
A. W. COPLAND.
DOUGH STRIPPING MECHANISM.
APPLICATION FILED MAR. 21, 1904.
2 SHEETS—SHEET 1.
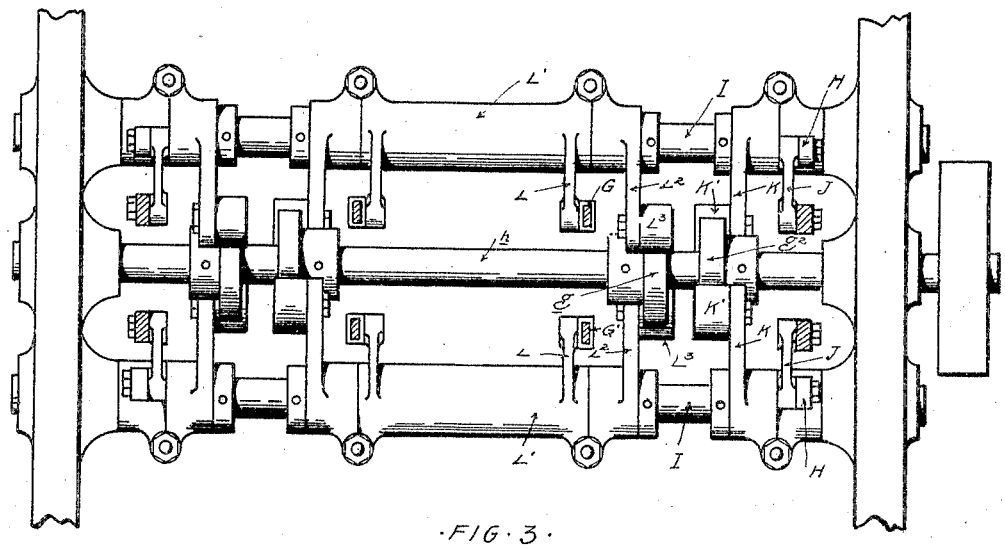
FIG. 3.
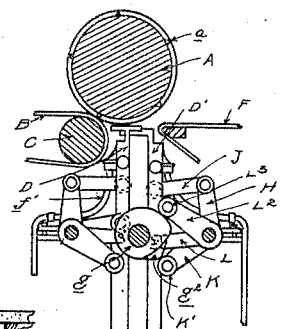
FIG. 4.
FIG. 1.
WITNESSES
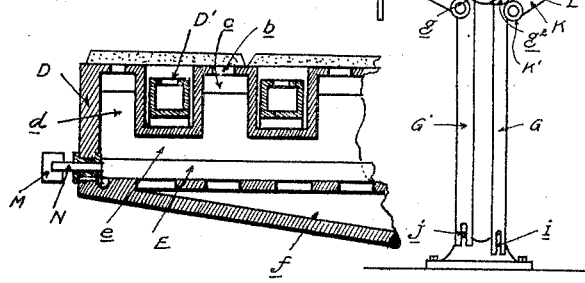
INVENTOR
ALEXANDER W. COPLAND.
BY James Whittemore
ATT'Y.

No. 783,930.

Patented February 28, 1905.

UNITED STATES PATENT OFFICE.

ALEXANDER W. COPLAND, OF DETROIT, MICHIGAN.

DOUGH-STRIPPING MECHANISM.

SPECIFICATION forming part of Letters Patent No. 783,930, dated February 28, 1905.

Application filed March 21, 1904. Serial No. 199,279.

*To all whom it may concern:*

Be it known that I, ALEXANDER W. COPLAND, a citizen of the United States, residing at Detroit, in the county of Wayne and State of Michigan, have invented certain new and useful Improvements in Dough - Stripping Mechanism, of which the following is a specification, reference being had therein to the accompanying drawings.

The invention relates to dough cutting and feeding machines, and is more particularly designed for use in connection with rotary dough-cutters, its object being to strip and feed the dough from the cutter during its con15 tinuous operation.

The invention consists in the peculiar construction of the reciprocatory dough-feeder and the means employed for causing the dough to adhere thereto while moving in one direc20 tion and for releasing the dough in the return movement.

The invention furthermore consists in the peculiar construction, arrangement, and combination of parts, as hereinafter set forth.

In the drawings, Figure 1 is a longitudinal section through a rotary dough-cutter to which my improvement is applied. Fig. 2 is an enlarged view similar to Fig. 1. Fig. 3 is a horizontal section. Fig. 4 is a cross-section.

A is a rotary dough-cutter which is provided with the cutting-ribs $a$. B is a carrier for feeding the dough to the cutter, and C is a roll for the carrier B, against which the cutting is effected. In the operation of the cutter of this type the sheet of dough is fed over the carrier B, which travels at the same speed as the peripheral speed of the cutter, and consequently is severed into sections by the rib $a$. After passing beyond the carrier B the severed sections of dough must be stripped from the cutter and fed away therefrom, and to accomplish this without distorting the shape of the cut sections I have devised a combination feeding and stripping mechanism of the following construction.

D and D' are reciprocatory feeders which are arranged to move from the position beneath the cutter A and adjacent to the roll C to a position a short distance therefrom. These feeders are arranged in alternate or interspaced series, the feeders of each series being connected to a common actuating means and the two series being reciprocated positively. Each feeder is provided with a suction-face, preferably formed by perforations $b$ in the upper or dough-supporting face of the feeder, which perforations communicate with the chamber $c$, connected by the conduit $d$ to the chamber $e$, common to all the feeders of the series. The chamber $e$ is connected by the nipple $f$ with the suction-conduit $f'$.

E is a valve controlling the connection between the chamber $e$ and the nipple $f$ and which is adapted to be opened or closed, so as to alternately apply and cut off the suction from the feeders. Thus when the feeders are fed forward in the direction of travel of the dough the valve is opened, which will cause the dough section to adhere to the face of the feeder and remain in contact therewith during the forward movement. At the end of this movement the valve is closed, releasing the suction and permitting the feeder to be returned without the dough.

It will be understood from the description above given that the combined action of the two series of feeders D and D' is to continuously feed the dough away from the cutter. It will be also apparent that the effect of the suction applied to the feeders during their forward movement is to maintain the dough sections in contact with the feeders and prevent them from adhering to the cutter. The speed at which the feeders travel forward being the same as the peripheral speed of the cutter, the dough sections will be stripped from said cutter and fed away without distortion until received by the endless carrier F.

The feeders D and D' are not only reciprocated alternately in the plane of feed, but are also given a vertical movement, so that the returning series of feeders are depressed below the plane of the forward-moving feeders. Such an arrangement will make the forward feeding of the dough positive and without danger of any distortion due to the return movement of the feeders. The movement of the feeders is preferably effected through the actuation of cams $g\ g^2$ on the shaft $h$. (Shown in Figs. 2 and 3.) The feeders D and D' are connected to rocking standards G and G', and these standards are reciprocated laterally by rocking arms H, sleeved on the shaft I adjacent to the shaft $h$, said rock-arms being connected by links J with the feeders D and D'. The rock-arms H are actuated by rock-arms K, secured thereto and having antifriction-rolls K' engaging with cams $g^2$. Thus in the rotation of the shaft $h$ the feeders D and D' will be reciprocated.

The feeders are lowered during their return movement by the rock-arms L, which are connected with the standards G and G'. These rock-arms L are secured to sleeves L', which are loose upon the shafts I, and these sleeves are also provided with actuating rock-arms $L^2$, which project into proximity to cams $g$ on the shaft $h$ and engage therewith through the medium of antifriction-rolls $L^3$. The cams $g$ are fashioned to raise and lower the rock-arms $L^2$ and through the medium of the sleeves L' and rock-arms L correspondingly move the feeders D and D'. The rocking standards G and G' will permit of this raising and lowering by reason of slot-bearings $i$, which engage with the pivots $j$ for said standards.

The suction in feeders is controlled by valves E, as already described. These valves are automatically operated, so that in the forward movement of each feeder the valve will be opened; but before the limit of the forward movement is reached the valve will be closed. As shown, the means for effecting this consists of stationary stops M, which are adapted to engage with pintles N, projecting from the valves E at opposite ends thereof. These stops N are so arranged as to engage with the pintles at the opposite ends of the reciprocating movement of the feeders and respectively open and close the valves.

In the operation of the machine the dough fed over the carrier B will pass beneath the cutter A, which will sever it into sections, and these sections will then be fed forward at the same speed by the feeders D and D' until received by the carrier F. While in contact with the feeders D and D' the dough sections will be stripped from the cutter by reason of the suction in the feeders, and before the limit of the forward movement is reached the suction will be relieved, so as to permit the disengagement of the feeders and their return.

What I claim as my invention is—

1. In a dough-feeding mechanism, a reciprocating feeder and means for producing suction at the bearing portion of said feeder, during its forward movement, and for relieving said suction during the return movement.

2. In a dough-feeding mechanism, a plurality of reciprocating feeders alternately moving in opposite directions, and means for applying suction to said feeders to hold the dough thereon during the forward movement, and of relieving said suction to permit of the return movement of the carrier.

3. In a dough-feeding mechanism, two alternately-reciprocating interspaced series of feeders, and means for applying suction to each series of feeders during a forward movement, and for relieving the suction during return movement.

4. The combination with a rotary dough-cutter of a reciprocating feeder arranged adjacent to the delivering-point of said cutter, and means for applying suction to said feeder, to hold the dough in contact therewith during its forward travel, and while separating the dough from the cutter, and for relieving said suction before the return movement of said feeder.

In testimony whereof I affix my signature in presence of two witnesses.

ALEXANDER W. COPLAND.

Witnesses:
JAS. P. BARRY,
H. C. SMITH.